(12) United States Patent
Buchinger et al.

(10) Patent No.: US 9,046,136 B2
(45) Date of Patent: Jun. 2, 2015

(54) SYNCHRONIZER HUB

(75) Inventors: Juergen Buchinger, Gmunden (AT);
Christian Kronberger, Vorchdorf (AT);
Martin Ohler, Vorchdorf (AT); Horst Roessler, Wels (AT)

(73) Assignee: Miba Sinter Austria GmbH, Laakirchen (AT)

( * ) Notice: Subject to any disclaimer, the term of this patent is extended or adjusted under 35 U.S.C. 154(b) by 0 days.

(21) Appl. No.: 14/344,111

(22) PCT Filed: Sep. 13, 2012

(86) PCT No.: PCT/AT2012/050136
§ 371 (c)(1),
(2), (4) Date: Mar. 11, 2014

(87) PCT Pub. No.: WO2013/036981
PCT Pub. Date: Mar. 21, 2013

(65) Prior Publication Data
US 2014/0246285 A1    Sep. 4, 2014

(30) Foreign Application Priority Data

Sep. 14, 2011 (AT) ................................. A 1316/2011

(51) Int. Cl.
*F16D 23/06* (2006.01)
*F16D 11/00* (2006.01)

(52) U.S. Cl.
CPC ............... *F16D 11/00* (2013.01); *F16D 23/06* (2013.01); *F16D 2023/0637* (2013.01)

(58) Field of Classification Search
CPC .................... F16D 11/00; F16D 2023/0637

USPC ................................ 192/53.35, 53.343, 53.34
See application file for complete search history.

(56) References Cited

U.S. PATENT DOCUMENTS

| | | | |
|---|---|---|---|
| 2,393,153 A | | 1/1946 | Fishburn |
| 3,035,674 A | * | 5/1962 | Peras ......................... 192/53.35 |
| 3,080,028 A | * | 3/1963 | Kennedy .................. 192/53.343 |
| 3,228,499 A | * | 1/1966 | Peras ......................... 192/53.35 |
| 3,795,293 A | | 3/1974 | Worner |
| 4,445,602 A | * | 5/1984 | Chana ........................ 192/53.32 |
| 4,830,159 A | * | 5/1989 | Johnson et al. ............ 192/53.32 |
| 5,743,367 A | * | 4/1998 | Hofmann et al. ............ 192/70.2 |
| 2004/0062673 A1 | * | 4/2004 | Trasorras et al. ............... 419/28 |
| 2009/0195058 A1 | | 8/2009 | Jackson et al. |

FOREIGN PATENT DOCUMENTS

| | | | |
|---|---|---|---|
| DE | 1 811 720 A1 | 6/1970 | |
| DE | 2 061 620 A1 | 7/1972 | |
| DE | 197 55 613 A1 | 6/1999 | |

(Continued)

OTHER PUBLICATIONS

International Search Report of PCT/AT2012/050136, mailed Jan. 22, 2013.

*Primary Examiner* — Richard Lorence
*Assistant Examiner* — David Morris
(74) *Attorney, Agent, or Firm* — Collard & Roe, P.C.

(57) ABSTRACT

A method and a device stretches and forms a foil blank and a product is produced by this method. The foil blank is stretched in at least one direction and slides along in at least one direction during the deformation. The sliding along may be controlled, and the clamping force and the clamping speed may be regulated.

11 Claims, 5 Drawing Sheets

(56) References Cited

FOREIGN PATENT DOCUMENTS

| | | |
|---|---|---|
| DE | 10 2009 007 848 A1 | 8/2010 |
| EP | 1 096 164 A2 | 5/2001 |
| FR | 2 390 633 A1 | 12/1978 |
| GB | 1 267 579 A | 3/1972 |
| GB | 2 065 800 A | 7/1981 |

* cited by examiner

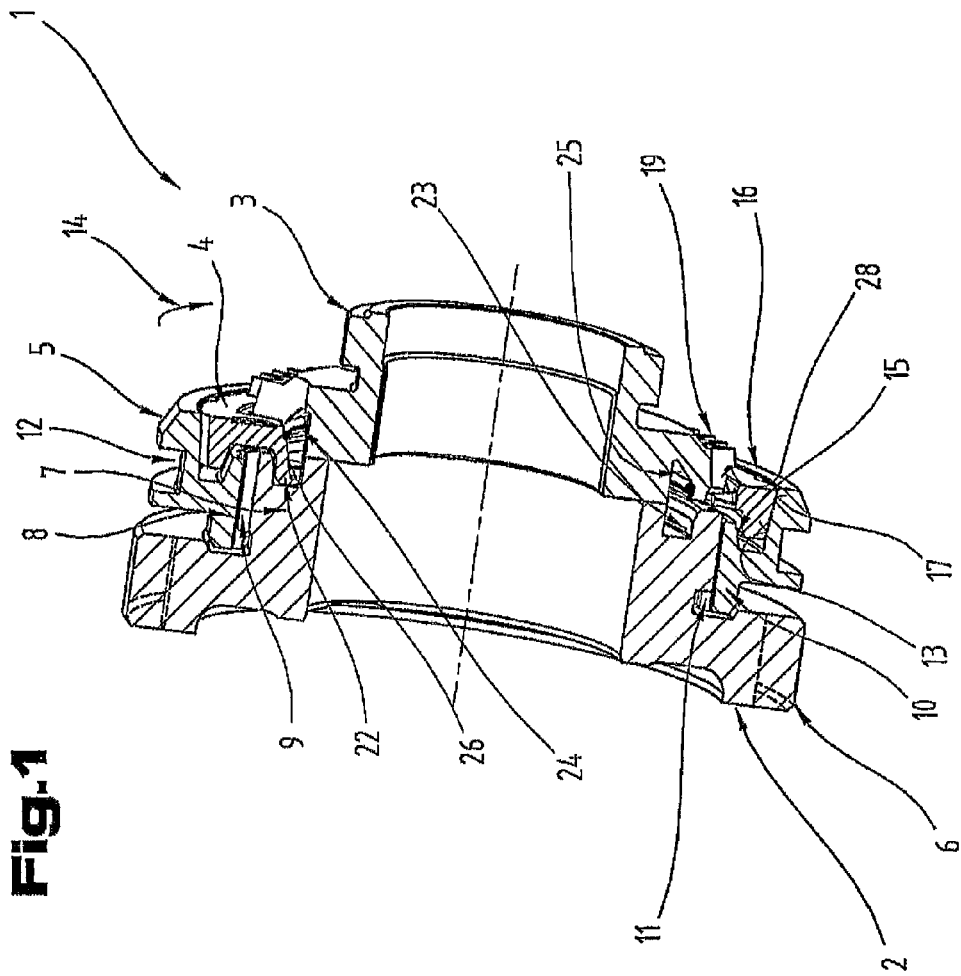

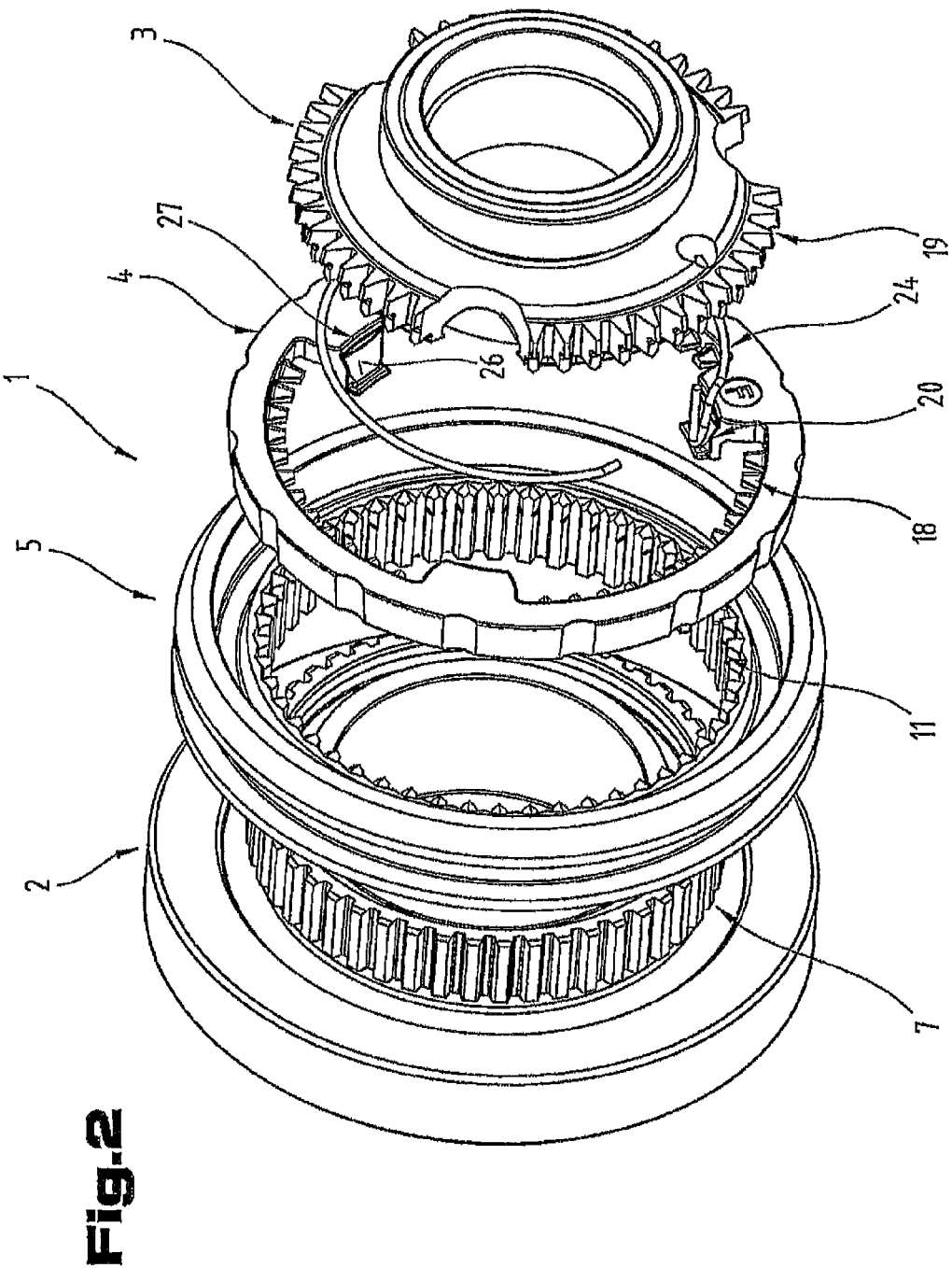

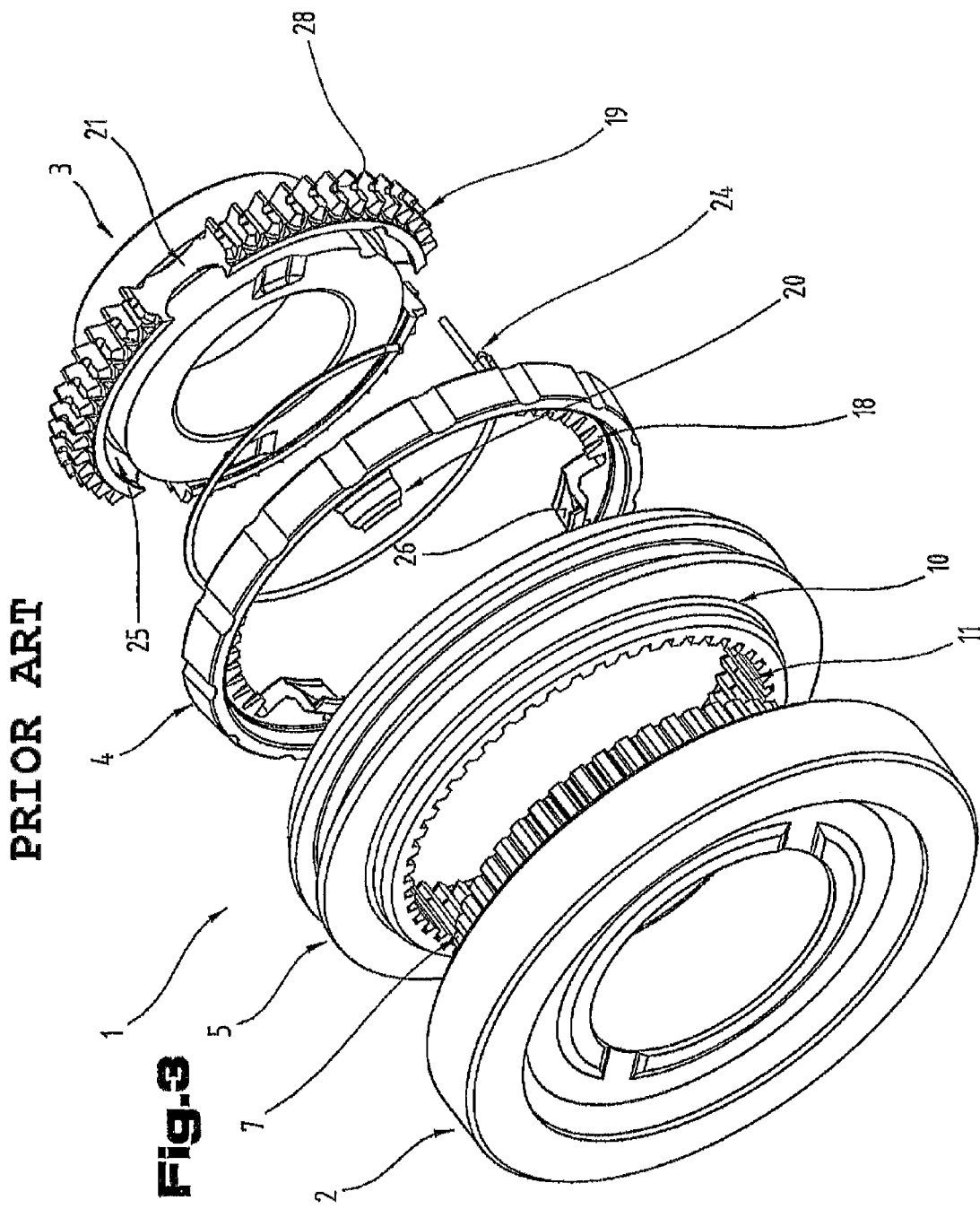

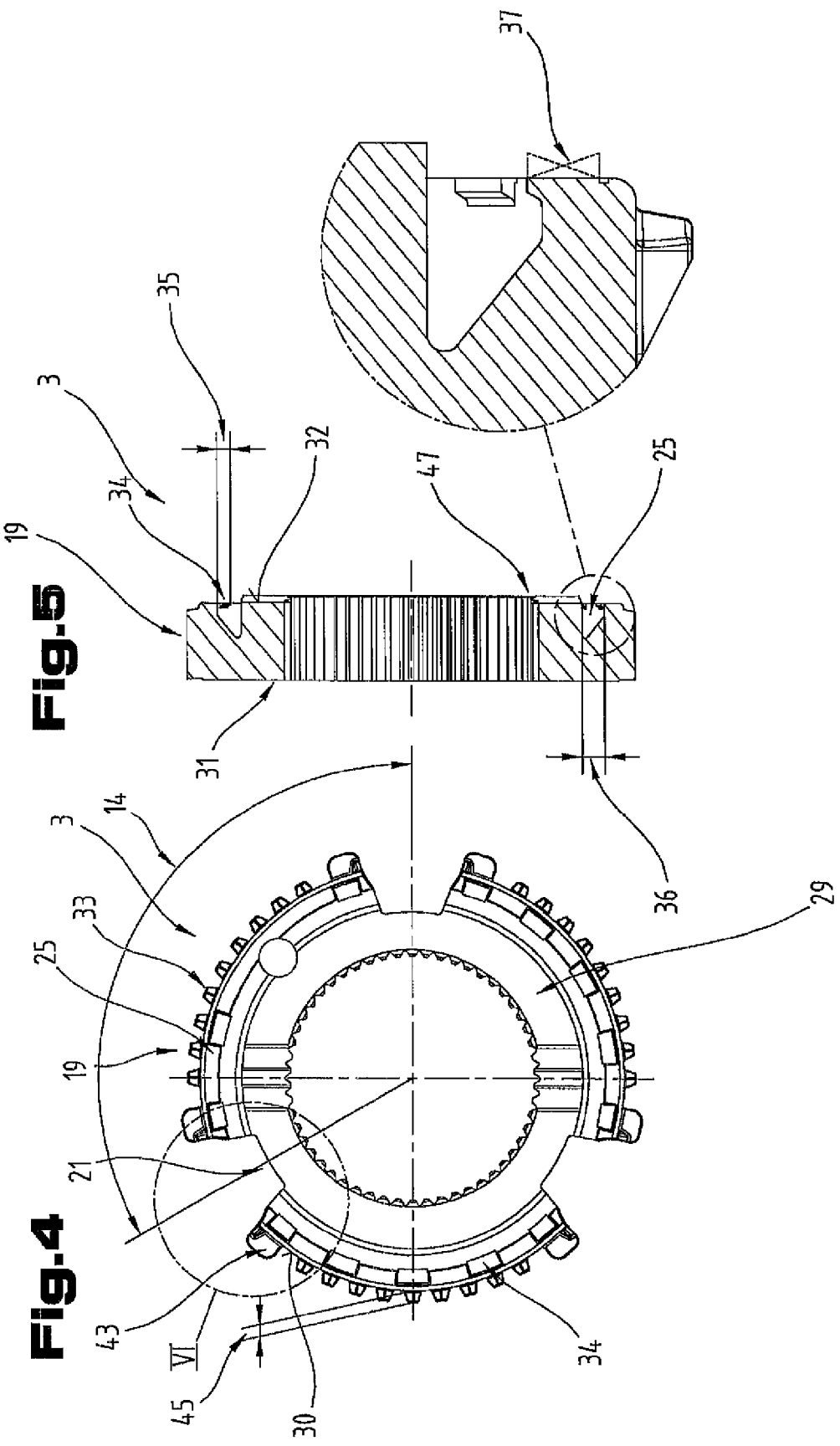

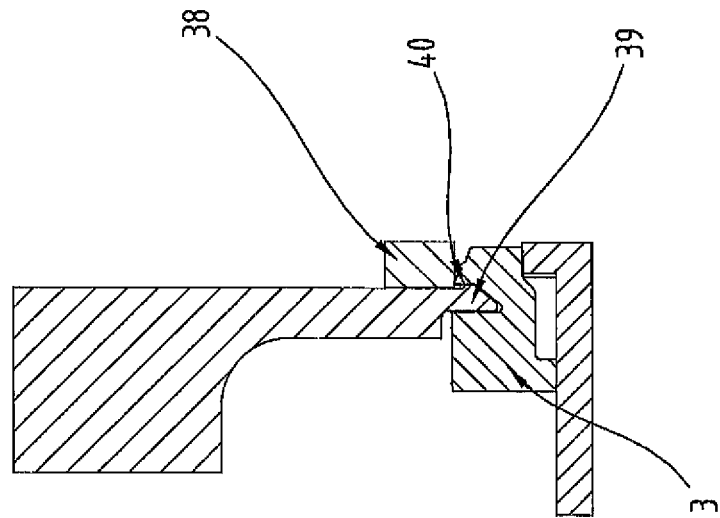
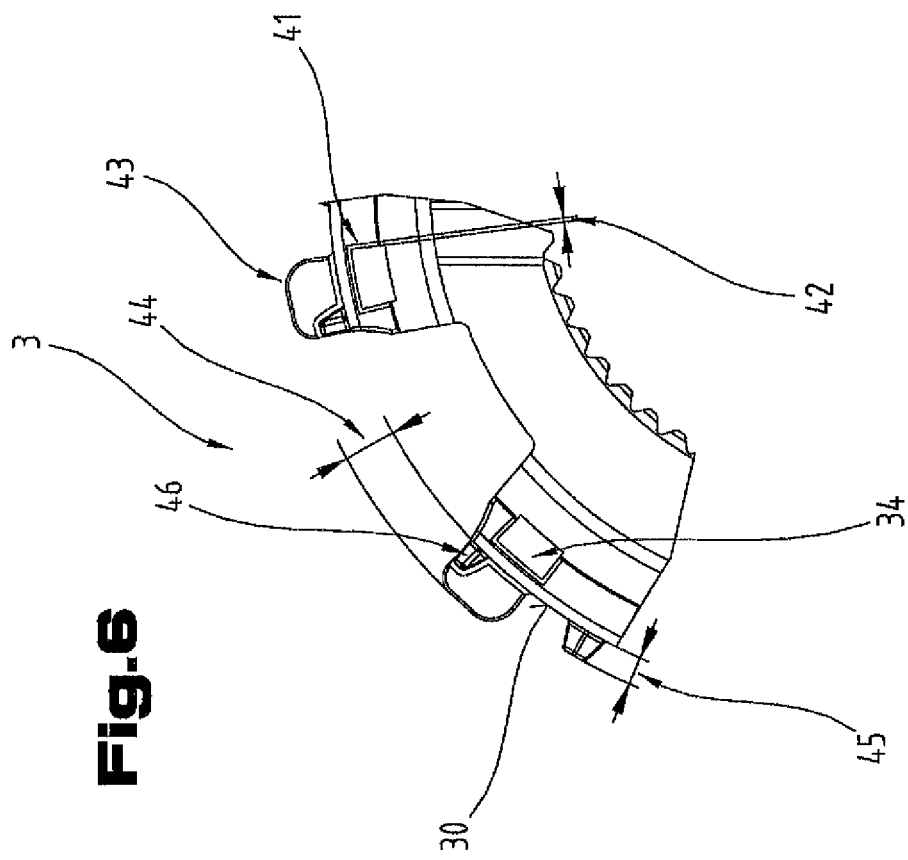

SYNCHRONIZER HUB

CROSS REFERENCE TO RELATED APPLICATIONS

This application is the National Stage of PCT/AT2012/050136 filed on Sep. 13, 2012, which claims priority under 35 U.S.C. §119 of Austrian Application No. A 1316/2011 filed on Sep. 14, 2011, the disclosure of which is incorporated by reference. The international application under PCT article 21(2) was not published in English.

The invention relates to a synchronizer hub for a gearbox synchronization device of a manual gearbox, comprising a base body which comprises a radially outer peripheral surface and two axial end faces which adjoin the peripheral surface, wherein on the peripheral surface a tooth system is arranged with radially outwards pointing teeth which is interrupted by at least one recess, and comprising an annular groove which is arranged in one of the axial end faces and below the tooth system, wherein the annular groove is also interrupted by the at least one recess, a synchronizer hub for a gearbox synchronization device of a manual gearbox, comprising a base body which comprises a radially outer peripheral surface and two axial end faces that adjoin the peripheral surface, wherein on the peripheral surface a tooth system is arranged with radially outwards pointing teeth, which is interrupted by at least one recess, as well as a gearbox synchronization device comprising a synchronizer hub with external synchronization.

A synchronizing clutch of this kind with external cone synchronization for change speed gearboxes, in particular in motor vehicles, is known from DE 10 2009 007 848 A1. The latter comprises a shift gear of a gear mounted rotatably on a gear shaft, a synchronizer hub secured onto the gear shaft, which can be coupled by an axially displaceable shift sleeve to a drive tooth system via a shift tooth system to the shift gear, wherein by means of an external cone-synchronizer ring with a radially internal locking tooth system synchronization can be achieved between the gear shaft and the shift gear, in that the synchronizer ring interacts with its radially outer frictional face with an inner cone of the shift sleeve. The shift sleeve is arranged axially displaceably immediately adjacent to the shift gear on a hub section of the shift gear supporting a drive tooth system gear. The inner cone of the shift sleeve on the side averted from the shift gear cooperates with the synchronizer ring. The shift tooth system in a coupled state with the drive tooth system of the shift sleeve is formed on the axially adjoining synchronizer hub.

The objective of the present invention is to improve an external synchronization of this kind. In particular, part of the objective is also to improve the manufacturability of the synchronizer hub for such an external synchronization using a powder metallurgical method.

Said objective of the invention is achieved independently by the aforementioned synchronizer hub and by the aforementioned gearbox synchronization device, wherein with the synchronizer hub a plurality of segments are arranged on the axial end face, which segments extend in radial direction into the region of the annular groove and overlap the latter partly and/or with the tooth of the tooth system on the peripheral surface between the recess and next recess respectively at least one tab is arranged which forms an axial stop for a sliding sleeve, wherein a radial height of the tab forming an area that is raised relative to the toothing is at least partly higher than a tooth height of teeth of the tooth system in the same direction or the gearbox synchronization device is equipped with a synchronizer hub according to the invention.

It is an advantage in this case that by means of the segments the annular spring, which is usually used in such gearbox synchronization devices for indexing at the start of the shifting process, experiences better hold in axial direction and is thus prevented more effectively from sliding out of the annular groove. Although in this way the installation of the annular spring is slightly more problematic, as the segments protruding partly radially downwards over the annular groove have to be overcome by a greater pretensioning of the annular spring, subsequently owing to the securing of the annular spring the handling of said assembly consisting of the annular spring and the synchronizer hub is simpler. The segments can be configured to be structurally simple so that the production of the synchronizer hub with said segments is not more expensive or is not much more expensive than the synchronizer hub from the prior art. By designing the securing device or the axial stop for the annular spring as segments it is also achieved that said segments can be easily adapted to the synchronizer hub with regard to size and also with regard to positioning, so that the additional structural configurations of the components of the gearbox synchronization device can be better taken into account.

In the configuration of the synchronizer hub with the at least one tab as an axial stop for the shift sleeve it is an advantage that said tab(s) can be formed simply by means of a powder metallurgical method. In this way it is also possible for the stop surface to be kept relatively small, whereby the rotation of the synchronizer ring during the synchronization of the rotating speeds can be facilitated during the shifting process.

According to one embodiment variant the segments are designed to project in axial direction at least partly over the base surface. In this way on the one hand the strength of the segments can be improved under mechanical stress and on the other hand the material forming during the production of the segments can be achieved using less energy if the latter are produced by sintering, making the production of the synchronizer hub simpler.

For each recess at least one segment can be arranged in peripheral direction immediately adjoining the recess. In this way the increase of power from the annular spring mounted in the annular groove is improved, as it is easier to avoid too much axial displacement of the annular spring by the synchronizer ring, which bears against the annular spring in the region of the recess, in the region of the recess.

Preferably, the base body of the synchronizer hub or the synchronizer hub as a whole is made from a sintered material, as in this way the geometric configurations of the synchronizer hub can be produced more easily than a synchronizer hub made from a solid material, for example steel.

It is particularly preferable if the segments are configured in one piece with the base body and are produced by forming the base body at the same time as increasing the density. On the one hand in this way the production of the synchronizer hub is simplified in that the segments are already taken into consideration during the pressing of the sinter powder to a green compact, and on the other hand by means of sintering the material bond between the segments and the base body of the synchronizer hub is improved, whereby the mechanical stability of the segments can be improved. The latter can also be improved in that by shaping in the region of the segments an increase in density is achieved—compared to the synchronizer hub—prior to forming.

Preferably, in this case the segments are compacted in the region of the surface to a density, which is at least 95% of the total density of the material of the base body, whereby the mechanical strength of the segments can be improved further.

By means of forming the segments are configured with an undercut in the region of the annular groove. In order to avoid more effectively the removal of chips during the forming, a transitional area can be recessed between the base body and the segments in relation to the axial end face.

According to another embodiment variant of the synchronizer hub the tabs are arranged on both sides of the recess, whereby it is possible to achieve an equalization of the forces acting on the synchronizer hub during the synchronization.

Preferably, the raised area of the at least one tab extends only partly over a width of the tooth system in axial direction, the remaining part of the tab forming a part tooth of the tooth system. In this way the shifting precision of the synchronization i.e. the tracking of the synchronizer ring can be improved during the synchronization, in that the latter also engages in the region of the tab with the tooth system.

The teeth, i.e. the full teeth, of the tooth system are particularly preferably designed to be stepless in radial direction, whereby the production of the synchronizer hub can be simplified, in that in particular geometrically simpler and thereby more inexpensive molds can be used. In this way also the number of rejects caused by faults in the material in the region of the tooth system during demolding can be reduced.

To strengthen the area of the synchronizer hub around the recess with respect to the mechanical strength it is possible for the at least one tab to be arranged in peripheral direction immediately adjoining the at least one recess.

For this reason it is also possible that one of the segments is arranged in radial direction underneath the at least one tab.

For a better understanding of the invention the latter is explained in more detail with reference to the following Figures.

In a schematically simplified representation:

FIG. 1 shows a synchronizer clutch with external cone synchronization according to the prior art in an oblique view;

FIG. 2 shows the synchronizer clutch with external cone synchronization according to FIG. 1 in an exploded view;

FIG. 3 shows the synchronizer clutch with external cone synchronization according to FIG. 1 in another exploded view;

FIG. 4 shows a synchronizer hub according to the invention in an axial view;

FIG. 5 shows the synchronizer hub according to FIG. 4 in a cross-sectional side view;

FIG. 6 shows an enlarged section of the synchronizer hub according to FIG. 4 in axial view;

FIG. 7 shows a schematic representation of the production of undercut segments.

First of all, it should be noted that in the variously described exemplary embodiments the same parts have been given the same reference numerals and the same component names, whereby the disclosures contained throughout the entire description can be applied to the same parts with the same reference numerals and same component names. Also details relating to position used in the description, such as e.g. top, bottom, side etc. relate to the currently described and represented figure and in case of a change in position should be adjusted to the new position.

FIGS. 1 to 3 show a gearbox synchronization device 1 with an external cone synchronization, i.e. a synchronizing clutch, in various different representations, as known from the prior art, in particular the aforementioned DE 10 2009 007 848 A1. Gearbox synchronization devices 1 of this kind are known to be used for change speed gearboxes (manual gearboxes) in motor vehicles. The gearbox synchronization device 1 according to the invention is preferably used for reverse gear.

The gearbox synchronization device 1 comprises essentially a shift gear 2, a synchronizer hub 3, a synchronizer ring 4 and a shift sleeve 5. The synchronizer hub can be arranged in a nonrotational manner on a not shown shaft.

The shift gear 2 comprises an external tooth system 6 by means of which a corresponding drive torque can be transmitted. On the shift gear 2 an axially extending hub section 7 can be arranged or formed in one piece, which comprises a drive tooth system 9 on an outer circumference 8. On said drive tooth system 9 an inner hub 10 of the shift sleeve 5 can be guided axially displaceably over a corresponding sleeve internal tooth system 11.

The shift sleeve 5 comprises an outer annular groove 12 into which a shift fork can engage as generally known. Furthermore, the shift sleeve 5 comprises an inner cone surface 13 which is formed peripherally and continuously in peripheral direction 14. The inner cone surface 14 is formed in an annular groove 15 which is formed on a side 16 of the sliding sleeve 5 facing away from the shift gear 2. Said inner cone surface 14 of the shift sleeve 5 interacts with a radially outer friction cone surface 17 of the synchronizer ring 4. The inner cone surface 13 and/or the friction cone surface 17 can be provided with corresponding friction linings known from the prior art.

The synchronizer ring 4 comprises a radially inner locking tooth system 18 which interacts with an external tooth system 19 of the synchronizer hub 3. It is generally known that the locking tooth system 18 of the synchronizer ring 4 can only by pushed with its roof-like oblique tooth flanks onto the external tooth system 19 of the synchronizer hubs 3 if there is synchronization between the synchronizer ring 4 and the shift sleeve 5 or the shift gear 2.

The synchronizer ring 4 is provided with three radially inwardly projecting drives 20 which project with circumferential play into three recesses 21 worked into the synchronizer hub 3, wherein the recesses 21 interrupt the external tooth system 19 of the synchronizer hub 3. In this area there is also no locking toothing 18 on the synchronizer ring 4. Of course, also more than three or fewer than three recesses 21 can be formed on the synchronizer hub 3 or drive 20 on the synchronizer ring 4, for example only one or two, or 4, etc.

The drives 20 have axially aligned sections 22 which project into an annular groove 23 formed on the end face of the hub section 7, and form a radial guide and axial guide to the shift gear 2 of the synchronizer ring 4.

Furthermore, the synchronizer ring 4 is guided on an open annular spring 24 which is held in an annular groove 25 of the synchronizer hub 2 and bears on oblique inner faces 26 of the sections 22 of the drive 20. The annular spring 24 is known to be used to hold the synchronizer ring 4 in the non-coupled state, i.e. the neutral position in a defined, axial position relative to the shift gear 2 or to the shift sleeve 5. The sections 22 can also have circular ring section-shaped shoulders 27 or recesses for holding or mounting the annular spring 24. During the shifting procedure the annular spring 24 is used as a first resistance in axial direction and thus causes a first friction torque for increasing the shifting power (presynchronization power) on the external synchronization.

To secure the annular spring 24 the latter can have an axially protruding end section which projects into a recess of the synchronizer hub 3, as shown e.g. in FIG. 2.

The external tooth system 19 of the synchronizer hub 3 is also provided with radially protruding stop surfaces 28 which form an axial stop for the shift sleeve 5 in the coupled state of the gearbox synchronization device 1. The external tooth system 19 is configured in other words in the form of a stepped tooth system.

The shift gear 2 can form a reverse gear with a fixed gear and a reverse gear on another gear shaft (not shown) which can be shifted by means of the gearbox synchronization device 1.

With regard to the sequence of the function of the synchronous clutch 10 reference is made to explanations given in the prior art.

FIGS. 4 to 6 show a synchronizer hub 3 according to the invention. The type and the structural design of the additional components of the gearbox synchronization device 1 can correspond to the embodiment of an external synchronization described in FIGS. 1 to 3, so that there is no need to repeat the explanations. Reference is therefore made to the above explanations.

The synchronizer hub 3 comprises a base body 2, which has a radially outer peripheral surface 30 and two axial end faces 31, 32, which adjoin the peripheral surface 30. On the peripheral surface 30 the external tooth system 19 is arranged or configured with radially outwardly pointing teeth 33. The external tooth system 19 is interrupted by the at least one recess 21 in peripheral direction 14. Furthermore, the synchronizer hub 3 comprises the annular groove 25 which is formed in the axial end face 32. Said axial end face 32 points in the installed position of the synchronizer hub 3 in the direction of the synchronizer ring 4 (FIG. 1). The annular groove 25 is arranged or formed underneath the external tooth system 19. Furthermore, the annular groove 25 is also interrupted by the at least one recess 21.

As an axial stop for the annular spring 24 (FIG. 1) a plurality of segments 34 are arranged or formed on the axial end face. Said segments 34 extend in radial direction into the region of the annular groove 25, so that the latter is partly covered by the segments, as shown in particular from the cross-sectional view in FIG. 5. The segments 34 start from below the external tooth system 19.

The segments 34 are formed to be approximately rectangular in axial view to the axial end face 32, in particular in the form of a cut-out from a circular ring.

The number of segments 34 which are arranged or formed on the axial end face 32 can be between 6 and 20, in particular 9 and 17. In the present exemplary embodiment of the synchronizer hub 3 14 segments 34 are provided which are distributed on the three part areas between the three recesses 21, wherein two part areas are formed each with five segments 34 and one part area with four segments 34.

In radial direction the segments 34 can have an overlap 35—relative to the overlap of the annular groove 25—which is between 1% and 50%, in particular between 2% and 45%, of an annular groove height 36. It is an advantage in this case, if said overlap height 35 is at least as large as half the diameter of the annular spring 24 (FIG. 1) or is selected from a range with a lower limit of half the diameter of the annular spring 24 and an upper limit of a diameter of the annular spring 24.

The segments 34 can be designed to be planar with the axial end face 32. It is also possible however for the segments 34 to be designed to project in axial direction at least over the axial end face 32. At least partly means here that the segments 34 can be configured to project over a part of the segment height in radial direction planar with the axial end face 32 and in the remaining part segment to project over said end face 32, wherein in this case it is an advantage if the projecting part begins before the start of the annular groove 25—as seen in radial direction. It is also possible in a special configuration that a front outwardly pointing segment surface 37 is inclined relative to the axial end face 32 at an angle of inclination in radial direction, wherein the inclination can be such that the segment thickness increases in axial direction in the direction of the annular groove 25 so that the segments are thickest at their open end, as shown in FIG. 5 by a dash-dotted line or vice versa, as shown by a dashed line in FIG. 5. It is also possible for the segments 34 to be recessed at least partly in relation to the axial end face 32.

By means of the configuration of the segments 34 the synchronizer hub 3 thus has undercuts in the region of the annular groove 25.

In principle the segments 34 can be distributed in any way over the periphery in the region of the annular groove 25, a symmetrical distribution being preferred. However, an embodiment is preferred in particular in which for each recess 21 at least one segment 34 is arranged in peripheral direction at least approximately directly adjacent to the recess 21, preferably on both sides of the recesses) 21, as shown in FIGS. 4 and 6. The remaining segments 34 are distributed evenly at least within a section between two recesses 21.

In the preferred embodiment variant the base body 29 or the entire synchronizer hub 3 is configured as a sintered component made from a sintered material. As the sintering material a chromium powder is used in particular, which contains between 0.05 and 2 wt. %, in particular 0.2 wt. % or 1.8 wt. %, carbon. If necessary up to 1 wt. % copper and/or up to 2 wt. % nickel can be alloyed to improve the strength. In this way an easily hardening synchronizer hub 3 can be produced. In addition, low distortion heat treatment methods can be used. Heat treating methods known from the prior art can be used for the heat treatment. In this way it is possible to avoid the necessity of a subsequent treatment of the tooth system(s) and the segments 34 (and the tabs, as described further in the following) of the synchronizer hub 3 after hardening, whereby a reduction of production costs can be achieved.

In addition to the said material also other, possibly prealloyed sintering powders can be used.

The method of production of the synchronizer hub comprises in particular the steps (preferably in this sequence) pressing the sintering powder to form a green compact, sintering, calibrating (whereby with the said material at least superficially densities of over 7.45 g/cm$^3$ are achieved), forming the segments 32 and finishing.

As mentioned above the segments 34 are preferably formed in one piece with the base body 29 and produced by shaping the base body 29, in particular at the same time as increasing the density. The segments 34 after forming preferably have a density of at least 95%, in particular at least 98%, of the total density of the material of the base body 29 at least in the areas close to the surface (layer thickness up to 100 μm). FIG. 7 shows a possible forming tool 38 for shaping the segments 34 on the synchronizer hub 3. The forming tool 38 comprises a spike-like extension 39 which at the end is adapted to the cross section of the annular groove 25 so that the forming tool 38 can penetrate with play into annular groove 25. In the radial direction the extension 39 has a cross-sectional tapering 40 for receiving the material displaced during the forming/caulking, whereby the undercut part of the segments 34 can be produced. The segments 34 are produced individually in this case so that the shaping process has to be repeated according to the number of desired segments 34. Likewise the production of all of the segments is possible in one processing step. By means of a rotation of the forming tool 38 in the peripheral direction 14 (FIG. 5) of the synchronizer hub 3 the forming tool can be moved out of engagement with the produced segment 34 and removed from the annular groove 25. In principle however, other suitable forming tools can also be used for producing the segments 34.

It should be mentioned in this connection that although it is the preferred embodiment variant of the synchronizer hub 3 to design the segments 34 in one piece with the latter, it is also possible to produce the segments 34 individually and to connect them to the base body 29 in a form-fitting and/or material-fitting and/or force-fitting manner.

To form the segments 34 if necessary the base body 29 can be produced in this area with an excess dimension.

For the forming and shaping of the segments 34 it is advantageous if a transitional area between the base body 29 and the segments 34 is recessed in relation to the axial end face 32 forming in particular a groove-like recess 41, as shown in particular in FIG. 6. A maximum width 42 of the recesses 41 can be between 0.01 mm and 2 mm, in particular between 0.5 mm and 1 mm. The maximum depth of the recesses 41 can be between 0.01 mm and 2 mm, in particular between 0.5 mm and 1 mm.

According to a further embodiment variant of the synchronizer hub 3 on the peripheral surface 30 between the recess 21 and the tooth 33 of the external tooth system 19 closest to the recess 21 respectively a tab 43 is arranged which forms an axial stop for the sliding sleeve 5 (FIG. 1) during the synchronization. Preferably, such tab(s) 43 are provided on both sides of the recess(es) 21. The arrangement of the tabs can be provided alternatively or in addition to the segments 34 on the synchronizer hub 3.

The tab(s) 43 have a radial height 44 over the peripheral surface 30 which is greater than a tooth height 45 of the teeth 33 over the peripheral surface 30, wherein the maximum height 44 is such that the synchronizer ring 4 (FIG. 1) can slide over the tab(s) 43 during the synchronization. The tab(s) thus have at least partly a raised area in relation to the external tooth system 19.

As also shown in FIGS. 4 and 6 the at least one tab 43 or the tabs 43 are spaced apart from the respectively adjacent tooth 33. The spacing can in this case be greater than the width of the tooth gaps between the teeth 33 of the external tooth system 19.

The at least one tab 43 preferably has rounded edges—as viewed in axial direction—as shown in FIG. 6. Likewise a transition to the peripheral surface 30 of the base body 29 of the synchronizer hub 3 can be designed to be rounded.

In the preferred embodiment of the tab(s) 43 the raised area with the larger radial height 44 extends only over a part of the width of the external tooth system 19 in axial direction. The other part of the tab(s) 43 is configured with respect to the cross section in the form of a part tooth 46, as shown in FIG. 6, wherein the part tooth 46 can form part of the tooth system. The above explanations about the spacing of the tabs 43 from the respectively adjacent tooth 33 therefore relate in this case to the first full tooth (with respect to the cross section).

By means of the design of the tab(s) 43 it is possible preferably that the (full)teeth 33 of the external tooth system 19 unlike the synchronizer hub 3 of the prior art shown in FIG. 3 are configured to be stepless in radial direction, i.e. do not have any stop surfaces for the sliding sleeve.

As shown in particular from the detail of FIG. 6 the at least one tab 43 is arranged in peripheral direction 14 of the synchronizer hub 3 preferably adjoining directly the at least one recess 21. In the preferred embodiment a tab 43 is arranged respectively on each side of the recess(es) 21.

It is also preferable if one of the segments 34 is arranged respectively in radial direction below each tab 43.

The synchronizer hub 3 can also have a hub-like attachment 47 on the base body 29 extending in radial direction below the segment 34.

In the preferred embodiment variant the synchronizer hub 3 is formed as a whole in one piece.

The synchronizer hub 3 can be seen as a combination of synchronizer hub with a coupling body, as such components are known from the prior art, whereby a more compact gearbox synchronization device 1 can be achieved.

In particular, the synchronizer hub can be used for the reverse gear, e.g. of a six gear manual gearbox, but its use in other gearboxes is not excluded.

The exemplary embodiments show possible embodiment variants of the synchronizer hub 3, whereby it should be noted at this point that rather various different combinations of the individual embodiment variants are also possible and this variability, due to the teaching on technical procedure, lies within the ability of a person skilled in the art in this technical field.

Finally, as a point of formality, it should be noted that for a better understanding of the structure of the synchronizer hub 3 and the gearbox synchronization device 1 device the latter and its components have not been represented true to scale in part and/or have been enlarged and/or reduced in size.

| List of Reference Numerals | |
| --- | --- |
| 1 | gearbox synchronization device |
| 2 | shift gear |
| 3 | synchronizer hub |
| 4 | synchronizer ring |
| 5 | shift sleeve |
| 6 | external tooth system |
| 7 | hub section |
| 8 | circumference |
| 9 | drive tooth system |
| 10 | inner hub |
| 11 | sleeve internal tooth system |
| 12 | annular groove |
| 13 | inner cone surface |
| 14 | peripheral direction |
| 15 | annular groove |
| 16 | side |
| 17 | friction cone surface |
| 18 | locking tooth system |
| 19 | external tooth system |
| 20 | drive |
| 21 | recess |
| 22 | section |
| 23 | annular groove |
| 24 | annular spring |
| 25 | annular groove |
| 26 | inner face |
| 27 | shoulder |
| 28 | stop surface |
| 29 | base body |
| 30 | peripheral surface |
| 31 | end face |
| 32 | end face |
| 33 | tooth |
| 34 | segment |
| 35 | overlap height |
| 36 | annular groove height |
| 37 | segment surface |
| 38 | forming tool |
| 39 | extension |
| 40 | cross-sectional tapering |
| 41 | recess |
| 42 | width |
| 43 | tab |
| 44 | height |
| 45 | tooth height |
| 46 | part tooth |
| 47 | attachment |

The invention claimed is:

1. A synchronizer hub for a gearbox synchronization device of a manual gearbox, said synchronizer hub comprising a base body, which comprises a radially outer peripheral surface and two axial end faces, which adjoin the peripheral surface, an external tooth system arranged on the peripheral surface with teeth pointing radially outwards, at least one recess in the peripheral surface and interrupting the external tooth system, an annular groove arranged in a first axial end face of the two axial end faces and radially inward of the external tooth system, the annular groove also being interrupted by the at least one recess, and a plurality of segments on the first axial end face, said segments being arranged next to the at least one recess and extending in a radial direction into an area of the annular groove and partly overlapping the annular groove, wherein a first tooth of the teeth is disposed next to the at least one recess, wherein on the peripheral surface between the at least one recess and the first tooth a first tab is arranged which forms an axial stop for a sliding sleeve, wherein in a first direction a radial height of the first tab forming a raised area relative to the external tooth system is at least partly higher than a tooth height of the teeth of the external tooth system in the first direction, wherein the raised area of the first tab only extends partly over a width of the external tooth system in an axial direction, and wherein a remaining part of the first tab forms a partial tooth of the external tooth system.

2. The synchronizer hub as claimed in claim 1, wherein at least one segment of the plurality of segments at least approximately directly adjoins in a circumferential direction the at least one recess.

3. The synchronizer hub as claimed in claim 1, wherein the base body is made from a sintered material.

4. The synchronizer hub as claimed in claim 3, wherein the segments are formed in one piece with the base body and are produced by shaping the base body and at the same time increasing a density of areas of the base body.

5. The synchronizer hub as claimed in claim 3, wherein the segments have a density of at least 95% of a total density of a material of the base body at least in the region of a surface of the segments.

6. The synchronizer hub as claimed in claim 1, wherein a transitional area between the base body and the segments is designed to be recessed in relation to the first axial end face.

7. The synchronizer hub as claimed in claim 1, wherein the first tab is disposed on a first side of the at least one recess, and wherein a second tab is disposed on the peripheral surface on a second side of the at least one recess opposite from the first side of the at least one recess.

8. The synchronizer hub as claimed in claim 1, wherein the teeth of the external tooth system do not have any stop surfaces for the sliding sleeve.

9. The synchronizer hub as claimed in claim 1, wherein the first tab is arranged in a circumferential direction adjoining at least almost directly the at least one recess.

10. The synchronizer hub as claimed in claim 1, wherein one of the segments is arranged radially inward from the at least one tab.

11. A gearbox synchronization device comprising a synchronizer hub with external synchronization, wherein the synchronizer hub comprises a base body comprising a radially outer peripheral surface and two axial end faces adjoining the peripheral surface, an external tooth system arranged on the peripheral surface with teeth pointing radially outwards, at least one recess in the peripheral surface and interrupting the external tooth system, an annular groove arranged in a first axial end face of the two axial end faces and radially inward of the external tooth system, the annular groove also being interrupted by the at least one recess, and a plurality of segments on the first axial end face, said segments being arranged next to the at least one recess and extending in a radial direction into an area of the annular groove and partly overlapping the annular groove, wherein a first tooth of the teeth is disposed next to the at least one recess, wherein on the peripheral surface between the at least one recess and the first tooth a first tab is arranged which forms an axial stop for a sliding sleeve, wherein in a first direction a radial height of the first tab forming a raised area relative to the external tooth system is at least partly higher than a tooth height of the teeth of the external tooth system in the first direction, wherein the raised area of the first tab only extends partly over a width of the external tooth system in an axial direction, and wherein a remaining part of the first tab forms a partial tooth of the external tooth system.

\* \* \* \* \*